United States Patent Office 2,755,055
Patented July 17, 1956

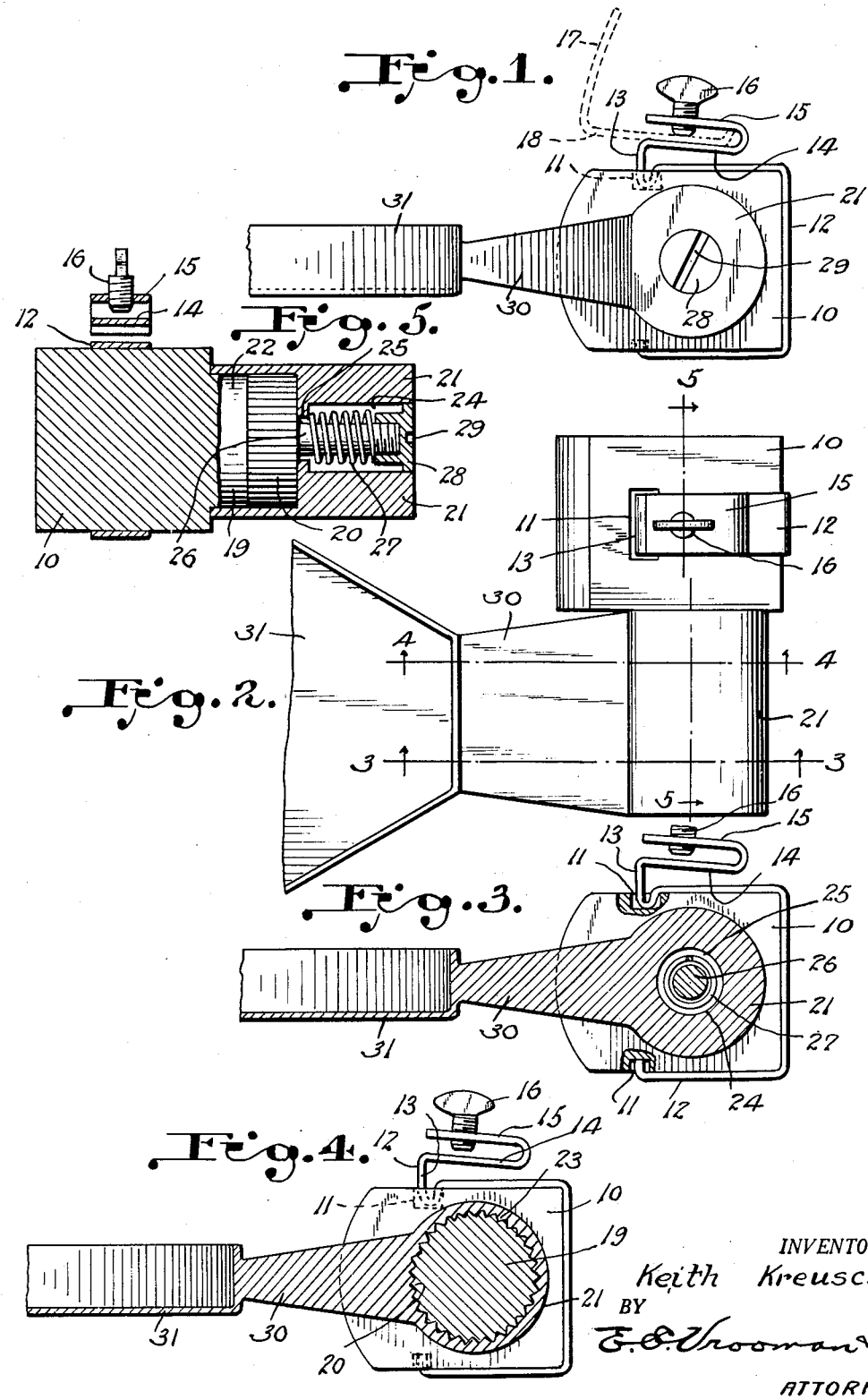

2,755,055

BRACKET FOR AUTO CAR TRAY

Keith Kreuscher, Kenosha, Wis.

Application November 20, 1953, Serial No. 393,338

1 Claim. (Cl. 248—291)

This invention relates to a tray supporting attachment for the dash panel of an automobile.

One important object of this invention is to provide a tray support which may be readily attached to and detached from the lower edge of an automobile dash panel.

A second important object of the invention is to provide a device of this description wherein the tray support may be adjustable for various angles relative to the dash panel to which it is applied, so that the tray supported thereby may be held in a horizontal position.

A third important object of the invention is to provide a device of this character with clip means for securing the same to the dash panel.

A fourth important object of the invention is to provide a rigid body secured to the dash panel and readily adjustable means for supporting a tray horizontally from said body.

With the above and other objects in view, the invention consists in general of certain novel details of construction and combinations of parts hereinafter fully described, illustrated in the accompanying drawings, and particularly claimed.

In the accompanying drawings, like characters of reference indicate like parts, and:

Fig. 1 is a side elevation of the invention as applied to the dash plate of an automobile.

Fig. 2 is a planned view thereof.

Fig. 3 is a section on the line 3—3 of Fig. 2.

Fig. 4 is a section on the line 4—4 of Fig. 2.

Fig. 5 is a section on the line 5—5 of Fig. 2.

As here shown, the invention is provided with a body 10 having parallel upper and lower sides in each of which is provided a socket 11. Surrounding 3 sides of this body is a clip 12 having lips 13, which extend into the sockets 11 and thus firmly grip the body. From the upper portion 12 the clip extends upwardly at 13, then rearwardly as at 14 and terminates in an end portion 15, which is parallel to the portion 14. Through the portion 15 extends a thumb screw 16. The automobile has a dash portion 17 having a forwardly turned end 18 which fits between the portions 14 and 15 of the clip so that the clip may be firmly clamped to the portion 18 by the thumb screw 16. Extending laterally from the body 12 is a cylindrical boss or shaft 19, the outer end of which is serrated as at 20. On this shaft 19 is fitted a rotary member 21 having a socket 22 fitting closely on the shaft 19 and this socket 22 is internally serrated as at 23 so that the serrations on the socket may engage the serrations 20 and thus hold the member 21 from revolution on the shaft 19. Obviously the member 21 may be fitted by its serrations on to the serrations 20 as desired. Extending from the socket 22, the member 21 has an axial recess 24, the inner end of which terminates by an annular lip 25. Extending from the shaft 19 is a stub shaft 26 having its free end threaded. Surrounding the stub shaft 26 is a coiled compression spring 27, one end of which is seated on the lip 25. Screwed on the free end of the stub shaft or stem 26 is a nut 28 against which the other end of the spring 27 seats. This nut 28 has a kerf 29, by means of which it may be adjusted on the stub shaft 26.

Extending rearwardly from the member 21 is an arm 30 carrying a platform member 31. This platform member serves to support a tray, not shown, in any desired position.

In the operation of the invention the clip, supporting the body 10, is attached to the part 18 of the automobile. In order to adjust the platform 31 to a horizontal position, the member 21 is pulled outwardly until the serrations thereon are free from the serrations 20 and rotated until the member 31 is in horizontal position. Then the serrations of the member 21 are allowed to engage the serrations 20, whereupon the member 31 will be fixed in horizontal position.

When in this horizontal position, a tray carrying food and drinks may be placed on the platform 31 and thus supported in convenient position for access by those in the automobile. There has thus been provided a simple and efficient device of the kind described and for the purpose specified. It is obvious that minor changes may be made in the form and construction of the invention without departing from the material principles thereof. It is not therefore desired to confine the invention to the exact form herein shown and described but it is wished to include all such as properly come within the scope claimed.

What is claimed as new is:

A serving tray attachment for automobiles having a dash panel, said attachment including a body, a shaft member projecting laterally from said body, a rotary member supported by the shaft member and movable longitudinally thereof, said members having each a series of annularly spaced serrations, said serrations being disposed to interlock and normally hold the rotary member against rotation in a selected angularly adjusted position, a tray supporting arm extending from said rotary member and carried thereby, said shaft member having a reduced and screw threaded spring mounting projecting axially therefrom into the rotary member, a compression spring surrounding the spring mounting and seated at one end against the rotary member, a nut screwed on said mounting and against which the remaining end of the spring is seated, and clip means for securing the body to the dash panel.

References Cited in the file of this patent

UNITED STATES PATENTS

| 257,050 | Munson | Apr. 25, 1882 |
| 839,729 | Chance | Dec. 25, 1906 |
| 919,981 | Unger | Apr. 27, 1909 |
| 1,117,270 | Sofio | Nov. 17, 1914 |
| 1,590,562 | Blonigen | June 29, 1926 |
| 2,488,316 | Mosby | Nov. 15, 1949 |

FOREIGN PATENTS

| 232,021 | Germany | of 1911 |